United States Patent

[11] 3,614,634

[72] Inventors James J. Jones
 Plano;
 David B. Oxford, Garland; Howard W. Zuch, Richardson, all of Tex.
[21] Appl. No. 854,688
[22] Filed Sept. 2, 1969
[45] Patented Oct. 19, 1971
[73] Assignee Texas Instruments Incorporated
 Dallas, Tex.

[54] FREQUENCY CONVERSION SYSTEM
 16 Claims, 5 Drawing Figs.
[52] U.S. Cl. ..................................... 328/140,
 307/233, 324/78 D, 328/136
[51] Int. Cl. ..................................... H03b 3/04
[50] Field of Search............................. 307/233,
 210, 271, 295; 325/136, 140; 324/78 D, 78 E

[56] References Cited
 UNITED STATES PATENTS
| | | | |
|---|---|---|---|
| 3,205,448 | 9/1965 | Bahrs et al. | 328/140 X |
| 3,214,698 | 10/1965 | Chesnut | 328/136 |
| 3,280,937 | 10/1966 | Faber, Jr. et al. | 307/233 X |
| 3,333,109 | 7/1967 | Updike | 328/140 X |
| 3,466,550 | 9/1969 | Wolf et al. | 328/136 X |
| 3,497,816 | 2/1970 | Fritz et al. | 328/140 X |
| 3,502,904 | 3/1970 | Bordonaro | 328/140 X |
| 3,518,558 | 6/1970 | Miller et al. | 307/271 X |

Primary Examiner—Stanley T. Krawczewicz
Attorneys—James O. Dixon, Andrew M. Hassell, Harold Levine, Melvin Sharp, Henry T. Olsen, Michael A. Sileo and John E. Vandigriff ABSTRACT: In many dynamic control systems, there is a need to rapidly and accurately convert the frequency of an input signal into a voltage proportional thereto. At a preselected time in a cycle of an input signal, a plurality of capacitors are charged to a reset level. After a fixed delay from the preselected time, each of the charged capacitors begins to discharge at a rate determined by the value of an RC network to generate a voltage signal that decays exponentially. The exponentially decaying voltage for each of the plurality of capacitors are summed together to produce a voltage that varies inversely with frequency. This voltage is the input signal to a sample and hold circuit. At the completion of one cycle of the input signal, the value of the voltage that varies inversely with frequency is read and stored as a voltage representative of the frequency of the input signal. Higher voltages correspond to fast frequency signals and lower voltages correspond to slow frequency signals. Conversion of a frequency takes place upon completion of a sampled cycle.

INVENTORS:
JAMES J. JONES
DAVID B. OXFORD
HOWARD W. ZUCH

INVENTORS:
JAMES J. JONES
DAVID B. OXFORD
HOWARD W. ZUCH

FREQUENCY CONVERSION SYSTEM

This invention relates to frequency conversion, and more particularly to the conversion of the frequency of an input signal into a representative voltage by sampling a function that decays at the rate of the inverse of an input frequency.

Previously, systems for converting a frequency into a representative voltage introduced a time delay between the input and output thereof. Basically, these earlier systems converted a frequency into a series of voltage spikes which were counted over a period of time to determine the input frequency. This integration or counting of voltage spikes by necessity introduced a delay before an output signal representative of an input frequency was generated. Further, present frequency converting systems require complicated logic circuitry and an accurate timing source.

An object of the present invention is to provide a frequency converting system. Another object of this invention is to provide a relatively fast conversion of a frequency signal into a representative voltage. Still another object of this invention is to provide a frequency converter that produces a representative output signal within one cycle of an input frequency. Further, an object of this invention is to provide a reliable system for converting a frequency into a representative voltage.

In accordance with the present invention, an input signal is converted into a square wave having a period corresponding to that of the input signal. This square wave triggers a timing circuit. The timing circuit generates pulses to activate a network for producing a voltage function that decays with time from a reset level. Timing pulses produced from the input wave also activate a circuit to stop the decay of this voltage function at a selected time in each cycle of the input frequency. At the time the decay of the voltage function is stopped, the value thereof will be stored as a measure of the input frequency. The higher the level of the voltage function at the time it stops decaying, the higher the frequency.

In a more specific embodiment of the present invention, an input signal is converted into a square wave having a period corresponding to that of the input signal. This square wave triggers a one-shot multivibrator to generate a timing pulse to turn on a circuit for charging an array of RC networks connected in parallel. After the capacitor of each RC network has been charged to a reset level, they collectively discharge through an amplifier circuit. The discharge voltage decays in accordance with the expression $V=1/f$. This decaying voltage connects to a sample and hold circuit. Upon the occurrence of a preselected time in each cycle of the input signal frequency, the value of the voltage in the sample and hold circuit is stored as a measure of the input frequency. This voltage represents in analog form the frequency of an input signal. It also programs the pulse width of the sample one-shot 16 to vary with the input frequency.

In another embodiment of the invention, clock pulses are generated and stored in an accumulator. The rate at which the clock pulses are stored in the accumulator varies along a curve that decays with time. Upon the occurrence of a selected time in a cycle of the input signal frequency, the accumulated clock pulses are connected to an output circuit. The total clock pulse accumulation being a measure of input frequency. This digital representation of an input frequency may be converted to an analog voltage.

A more complete understanding of the invention and its advantages will be apparent from the specification and claims and from the accompanying drawings illustrative of the invention. Referring to the drawings:

Figure 1:
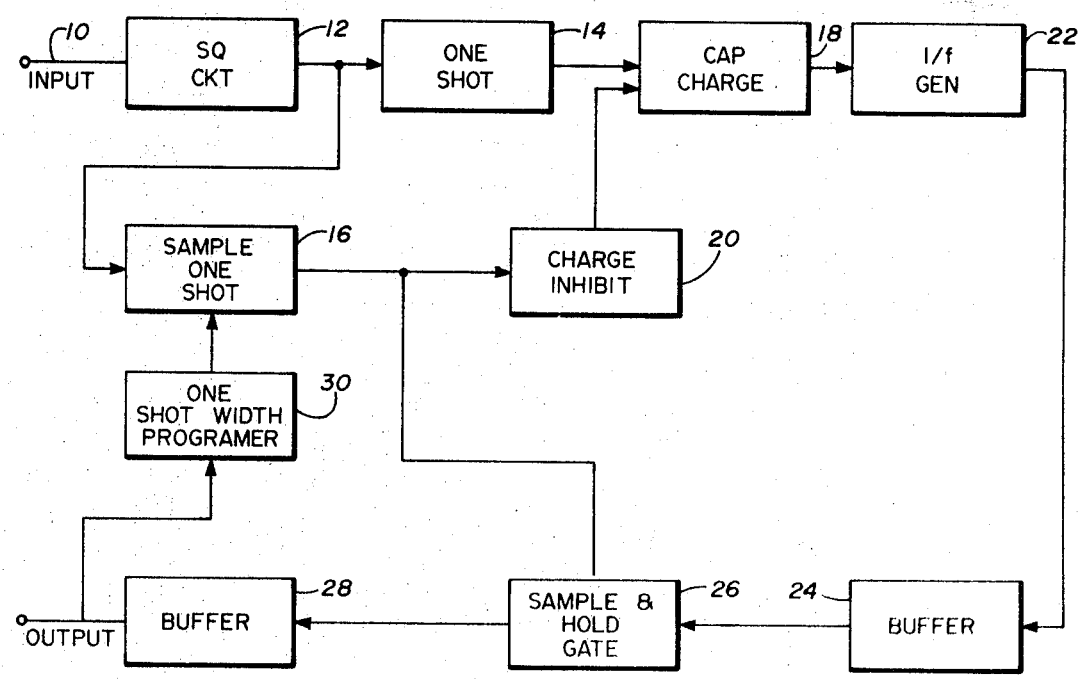
FIG. 1 is a block diagram of an analog frequency-to-voltage converter.

Referring to FIG. 1, an input signal, for example, varying as a sine wave, is connected to an input terminal 10 of a squaring circuit 12. The squaring circuit 12 generates a square wave having a period related to the period of the input signal frequency. A square wave is generated to produce sharp timing signals for operation of the frequency converter.

Connected to the output of the squaring circuit is a master pulse one-shot multivibrator 14 and a sample pulse one-shot multivibrator 16. Considering the one-shot multivibrator 14, this produces a timing pulse of a selected width upon each occurrence of a given point in each cycle of an input frequency. This series of timing pulses connects to one input of a charging circuit 18. A second input pulse to the charging circuit 18 is the output of a charge inhibit circuit 20 having an input connected to the one-shot multivibrator 16. In the multivibrator 16, a short pulse is generated which actuates the circuit 20 which in turn generates an output voltage to inhibit operation of the charging circuit 18. When the output of the charge inhibit circuit 20 drops to zero, the only input to the circuit 18 will be the pulse generated by the one-shot multivibrator 14. This pulse activates the charging circuit 18 which then provides a plurality of output voltages each decaying exponentially with time, for example, as the discharge of a capacitor through a resistor. These individual voltages are connected as inputs to a function generator 22 wherein they are combined into a function which varies in accordance with the equation:

$$V=1/f_1.$$

Connected to the output of the function generator 22 is a buffer amplifier 24 that has a high input impedance to avoid loading of the generator and a low output impedance that drives a sample and hold circuit 26. The output of the buffer amplifier 24 varies in a manner proportional to the output of the function generator 22. Accordingly, the input to the sample and hold circuit 26 decays in accordance with the equation given at (1) above.

Upon the occurrence of the output pulse from the multivibrator 16, the value of input signal to the circuit 26 is transferred to a capacitor (not shown) to be stored for subsequent processing. Since an output pulse occurs at the multivibrator 16 once for each complete cycle of the input frequency, the voltage stored in the circuit 26 will be determined by the time interval between pulses and the rate of decay of the output of function generator 22. This voltage is an input to a buffer amplifier 28 that has an output signal related to the frequency of the input signal. The output of the buffer amplifier 28 also connects to a pulse width programmer 30 for control of the one-shot multivibrator 16. Programmer 30 controls the output pulse width from the multivibrator 16 which, as explained, determines the inhibit time of the inhibit circuit 20.

In operation, an input signal is converted into a square wave having a period corresponding to that of the input frequency. This square wave signal activates the one-shot multivibrators 14 and 16. The multivibrator 16 produces a very short pulse to an inhibit circuit 20 which inhibits the operation of the charge circuit 18. After the initial inhibit period has expired, the output of the one-shot multivibrator 14 triggers the charging circuit to charge a series of capacitors to a reset level. Upon completion of the capacitor charging and at the end of the output pulse from the multivibrator 14, the charged capacitors begin to discharge and the individual discharge voltages are summed in the function generator 22 to produce a voltage function that decays with time in accordance with equation (1) above. This time varying voltage function is an input to the sample and hold circuit 26. Upon the occurrence of the next output pulse from the multivibrator 16, the instantaneous value of the time varying voltage from the function generator 22 is connected to a capacitor in the hold circuit 26. This stored voltage is then impedance amplified in the amplifier 28 which has an output related to the frequency of the input signal connected to the terminal 10.

The output pulse from the multivibrator 16 which triggers the hold circuit 26 also inhibits the charging circuit 18, as explained, to delay recharging the circuit capacitors to the reset level. The operation is thus repeated with the time varying function connected to the input of the sample and hold circuit 26 at each repetition. If the instantaneous value of the voltage stored in the circuit 26 is higher than from the previous value, the input frequency has increased. On the other hand, if the value of the voltage stored in the circuit 26 has decreased, the indication is that the input signal connected to the terminal 10 has a longer period. Thus, as soon as a change in frequency occurs at the input terminal 10, an output voltage representative thereof will be generated at the output of the buffer amplifier 28.

To inhibit the circuit 18 for a sufficient amount of time to insure storage of the time varying voltage in the circuit 26, the output of the buffer amplifier 28 controls a pulse width programmer 30. This controls the timing of the one-shot multivibrator 16 to produce a varying width output pulse to the charge inhibit circuit 20.

Figure 2:
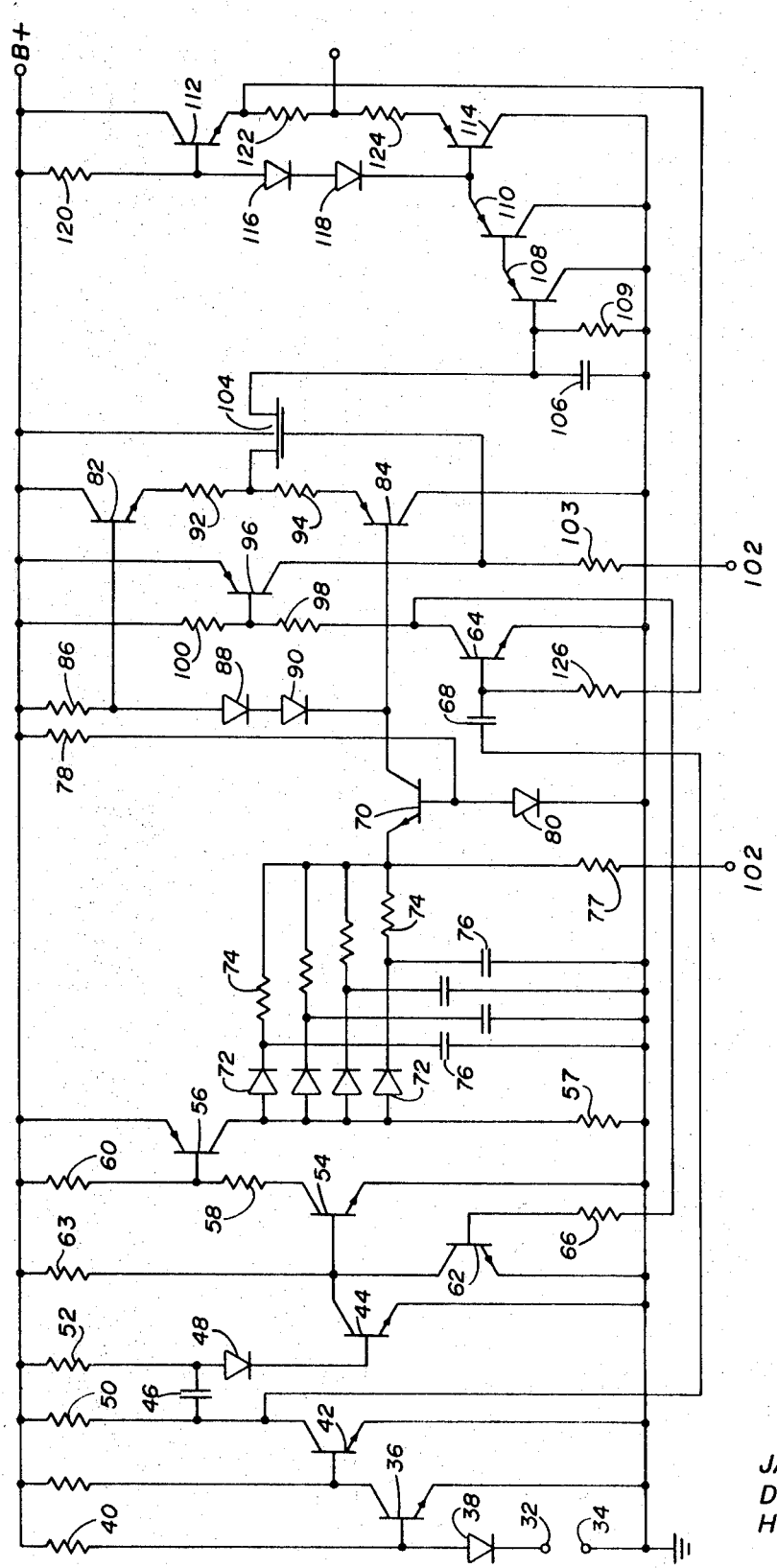
FIG. 2 is a schematic of the frequency converter illustrated in FIG. 1.

Referring to FIG. 2, there is shown a schematic of a frequency converter where an input signal having a wave shape as illustrated in FIG. 3A is connected to input terminals 32 and 34. Terminals 32 and 34 are in a base drive circuit for a transistor 36 which includes a diode 38 in series with a dropping resistor 40. With an input wave as illustrated at FIG. 3A, the transistor 36 will be alternately conducting and nonconducting as the input signal passes through the zero level. Note, that the wave illustrated at FIG. 3A shows an input signal that changes in frequency between each cycle and also has an amplitude change. It should be understood that usually the input signal connected to the terminals 32 and 34 will remain constant at some fixed frequency for some finite amount of time. Also, the amplitude of the input signal will usually remain at a fixed level and does not necessarily change with frequency. For purposes of describing this invention, however, the wave illustrated shows a continually changing frequency.

During the conducting time of the transistor 36, the collector electrode thereof is clamped to ground, thereby clamping the base electrode of a transistor 42 to ground. During the nonconducting time of the transistor 36, the collector electrode voltage will rise to the potential required to drive the transistor 42 into a conducting state and be held at this level. With the collector electrode of the transistor 36 at the "turn-on" voltage level of the transistor 42, transistor 42 will be conducting and the collector electrode thereof clamped to ground. When the base electrode of the transistor 42 is connected to ground through the conducting transistor 36, transistor 42 will be nonconducting and the collector electrode thereof will be at the supply voltage level. Thus, transistors 36 and 42 alternately conduct, depending on the polarity of the input signal connected to the terminals 32 and 34. Transistor 42, however, being driven by the output of the transistor 36, will switch rapidly from a conducting to a nonconducting state and back to a conducting state to produce a square wave as illustrated at FIG. 3B having a period equal to that of the frequency of the input signal. Transistors 36 and 42 comprise one form of the squaring circuit 12 illustrated in FIG. 1.

The output of the transistor 42 is coupled to the base electrode of a transistor 44 through a capacitor 46 and a diode 48. The transistor 44, the capacitor 46, the diode 48 and the resistor 52 comprise one form of the one-shot multivibrator 14 of FIG. 1. Also included in the collector circuit of the transistor 42 is a resistor 50 for controlling the current levels in the transistor 42 and the various other circuits connected thereto.

An output voltage from the transistor 44 is connected to the base electrode of a transistor 54. Transistor 54 drives a switching transistor 56, through a resistor network consisting of resistors 58 and 60, and receives base bias current through resistor 63. Also connected to the base electrode of the transistor 54 is an inhibit transistor 62 having a base electrode connected to the output of a transistor 64 through a resistor 66. Transistor 62 functions as the inhibit circuit 20 of FIG. 1, and the transistor 64 functions as the one-shot multivibrator 16. To drive the transistor 64, the base electrode thereof connects to the collector electrode of the transistor 42 through a coupling capacitor 68.

Figure 3:
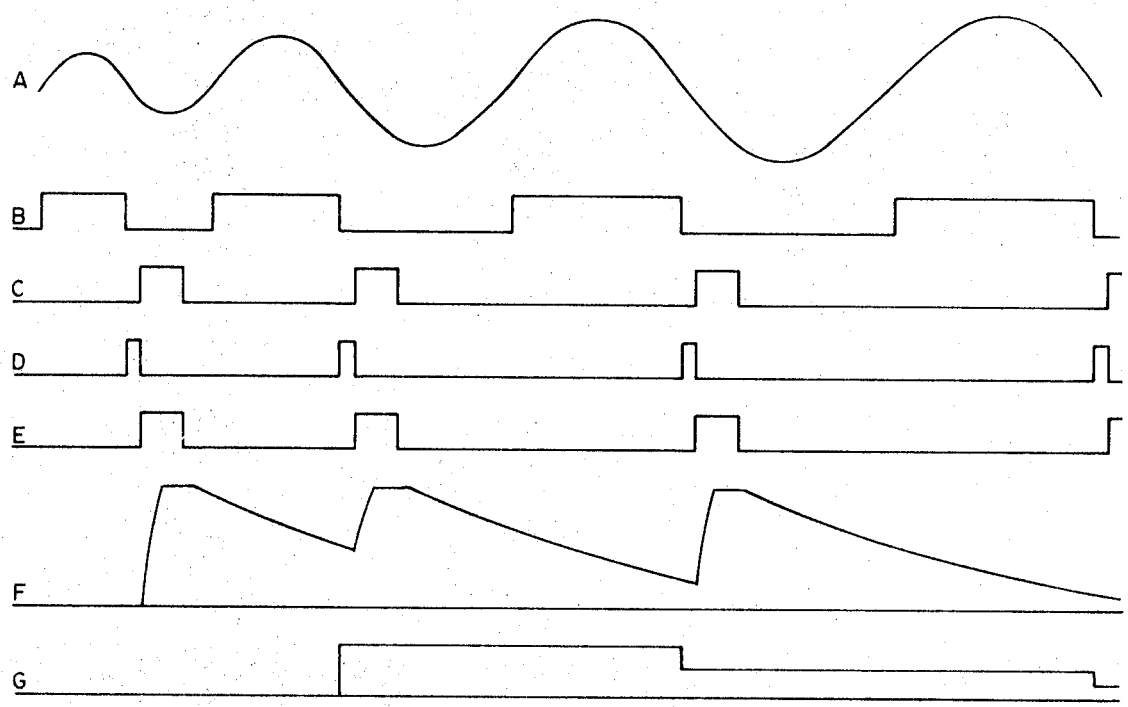
FIG. 3 is a series of curves appearing at terminal connections in the circuit of FIG. 2.

Referring to FIG. 3, the pulse wave forms illustrated at C, D and E appear at the collector electrode of the transistors 44, 64 and 56, respectively. An output pulse at the collector electrode of the transistor 44 has a leading edge displaced from the trailing edge of the output of the transistor 42, as illustrated at FIG. 3B. Aligned with the trailing edge of the pulse output at the transistor 42 is the leading edge of the inhibit pulse at the collector electrode of the transistor 64. During the period of the inhibit pulse when transistor 64 is in a nonconducting state, transistor 62 conducts, thereby clamping the base electrode of the transistor 54 to ground. Clamping the base of the transistor 54 to ground drives this transistor into a nonconducting state. Transistor 54 remains nonconducting so long as the transistor 64 is turned on. When the transistor 64 turns on, transistor 62 turns off and the collector electrode of the transistor 44 increases to the level required to turn on the transistor 54. This is the pulse signal illustrated at FIG. 3C. Conduction of transistor 54 drives the transistor 56 into a conducting state.

Connected to the output of the transistor 56 is a plurality of parallel RC networks having a common interconnection to the emitter electrode of a transistor 70. Each of the RC networks comprises a diode 72 in series with a resistor 74. A capacitor 76 connects to the junction of the diode and resistor. Each network has a different time constant to produce a voltage that decays exponentially with time at a different rate. As an example of a complete arrangement, one network includes a 0.0218 $\mu$f. capacitor and a 15 K-ohm resistor, a second network includes a 0.00472 $\mu$f. capacitor and a 21.5 K-ohm resistor, a third network includes a 0.0684 $\mu$f. capacitor and an 18.2 K-ohm resistor, and the fourth network includes a 0.1492 $\mu$f. capacitor and a 56.2 K-ohm resistor.

The exponentially decaying voltages from the RC networks are combined by an interconnection to the emitter electrode of the transistor 70. This sum of all the voltages varies in accordance with the equation $V=1/f$. Transistor 70 is biased into a conducting state by a circuit that includes a resistor 78 and a diode 80. Transistor 70 comprises the function generator 22 of the system of FIG. 1.

An output from the transistor 70 connects to a buffer amplifier including push-pull coupled transistors 82 and 84. The base electrode of transistor 82 connects to the junction of a resistor 86 and a pair of diodes 88 and 90. The base electrode of transistor 84 is direct coupled to the collector electrode of the transistor 70. Thus, the transistors 82 and 84 are both driven by the time varying voltage function at the collector of the transistor 70, with the difference between the respective base drive voltages equal to two diode voltage drops. Transistors 82 and 84 are connected between the positive terminal of the DC supply source and ground in a series circuit that includes resistors 92 and 94. An output voltage from the transistors 82 and 84 is taken from the interconnection of the resistors 92 and 94. This voltage also varies in accordance with equation (1) above.

In operation of the RC network and the push-pull transistors 82 and 84, turning on the transistor 56 charges each of the capacitors 76 through the diodes 72 to the voltage connected to the terminal 45. This charging action takes place during each pulse illustrated at FIG. 3E. Upon completing the charging of the capacitors 76 to the reset level, the circuit reaches a steady state condition which exists so long as transistor 56 conducts. When transistor 56 goes "nonconducting," the capacitors 76 begin to discharge through the respective resistor 74 to produce a time varying voltage function at the base electrodes of the transistors 82 and 84 by operation of the transistor 70. Transistor 70 acts as a noninverting summing amplifier where the emitter electrode is a current summing junction. A resistor 77, connected to the negative terminal of a DC supply (Terminal 102), also connects to the emitter electrode of the transistor 70 and establishes the current level at the summing junction.

When transistor 56 turns on, the current at the summing junction is divided among the resistors 74. During this time, current through emitter electrode of the transistor 70 will be negligible and the transistor is turned off.

When transistor 56 turns off, at the end of the one-shot pulse at the collector electrode of the transistor 44, the capacitors 76 individually begin to discharge exponentially with time through the respective resistors 74. As the current in the various resistors 74 begins to decay, current in the emitter circuit of the transistor 70 increases, thereby turning on this transistor. Consequently, the collector electrode of the transistor 70 is driven in a negative direction in accordance with the function given at equation (1) above. The current at the emitter electrode of the transistor 70 varies inversely with the sum of the currents in the resistors 74, that is, as the current in the resistors 74 decreases, the current through the transistor 70 will increase. The voltage gain of the circuit is determined by resistors 77 and 86. Thus, transistor 70 comprises the function generator 22 of the system of FIG. 1.

A time varying function is also generated at the junction of the resistors 92 and 94. This junction voltage varies along the curve illustrated at FIG. 3F and continues to decrease until the trailing edge of a pulse at the transistor 42 turns on the transistor 64 to produce a pulse at the collector electrode thereof.

A pulse at the collector of transistor 64, as illustrated at FIG. 3D, turns off a transistor 96 connected to the collector electrode of the transistor 64 through a network including resistors 98 and 100. Turning off the transistor 96 causes the collector electrode thereof to be driven to the negative DC voltage level connected to the terminal 102 through resistor 103. A negative voltage at the collector electrode of the transistor 96 triggers a field-effect transistor 104 by a connection to the gate electrode thereof. Transistor 104 includes a source electrode connected to the junction of the resistors 92 and 94 and a drain electrode connected to a holding circuit consisting of a capacitor 106. Thus, during the time the transistor 96 is nonconducting (the width of a pulse illustrated at FIG. 3D), the transistor 104 conducts to charge the capacitor 106 to the level of the voltage at the junction of the resistors 92 and 94. Since this action takes place at each trailing edge of a pulse at the transistor 42, a voltage stored on a capacitor 106 will be related to the frequency of the input signal connected to the terminals 32 and 34.

A voltage stored on the capacitor 106 drives the base of a transistor 108 that is biased by a resistor network that includes resistors 109 and 120. An output from the transistor 108 connects to the base electrode of a transistor 110 which further amplifies the voltage stored on capacitor 106. Transistor 110 drives a buffer amplifier including push-pull coupled transistors 112 and 114. Transistor 114 is direct coupled to the emitter electrode of the transistor 110 and transistor 112 connects to the transistor 110 through diodes 116 and 118. The buffer amplifier further includes resistors 122 and 124. At the junction of the resistors 122 and 124, there is generated a voltage, illustrated at FIG. 3G, which is an analog representation of the input frequency.

To provide inhibit pulses to the transistor 54 and turn-on pulses to the transistor 104 that vary with input frequency, the voltage at the emitter electrode of the transistor 112 connects to the base electrode of the transistor 64 through a resistor 126. For upper range frequencies connected to the input terminals 32 and 34, transistor 64 is allowed to conduct for relatively short times compared to the conduction time for lower range frequencies. This produces very short inhibit pulses to the transistor 54 and sample pulses to the transistor 104 for the upper range frequencies. These shorter pulses insure that for higher frequency input signals the system will be returned to an "at ready" state prior to the beginning of another period of the input frequency.

Figure 4:
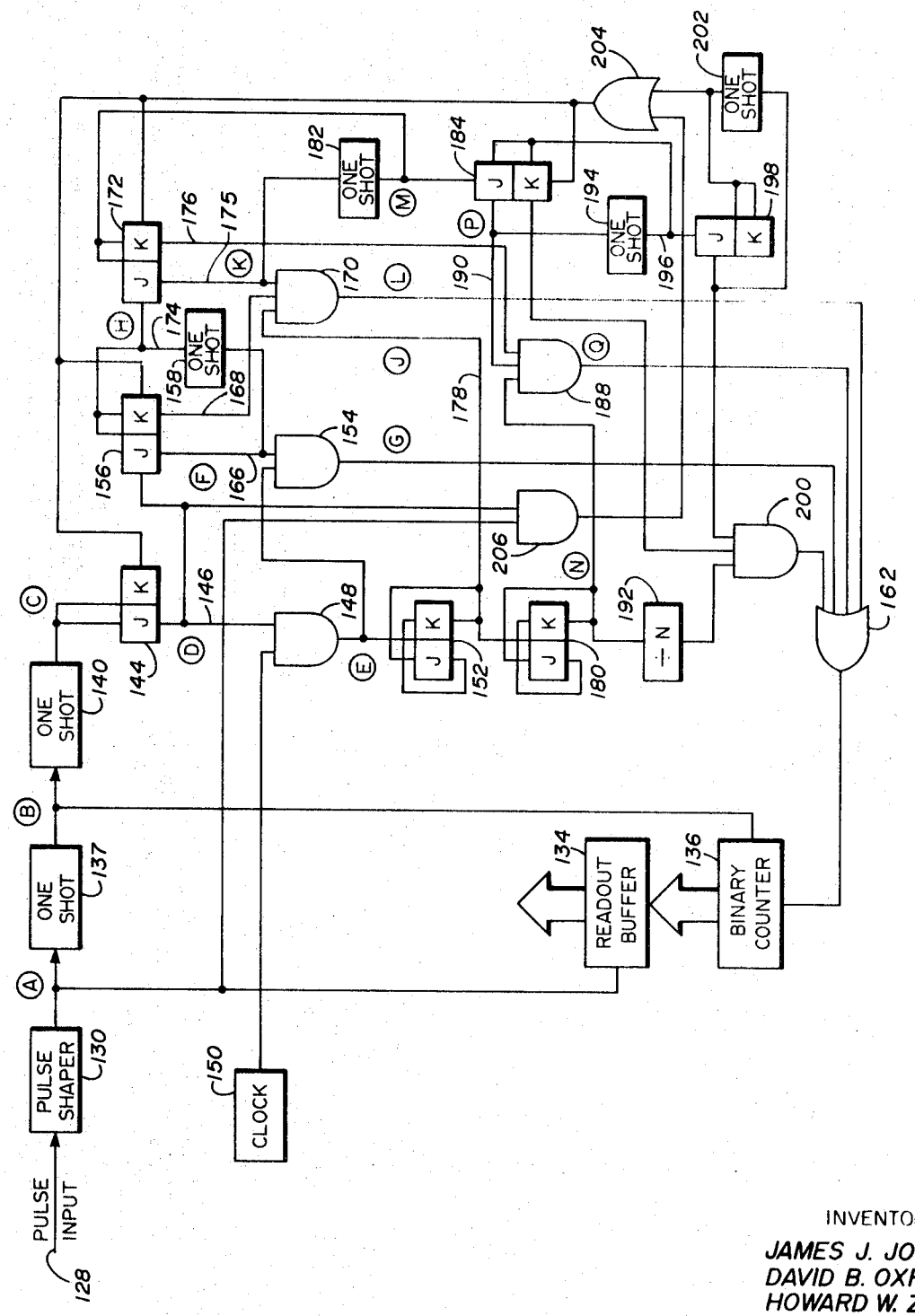
FIG. 4 is a digital embodiment of a frequency-to-voltage converter in accordance with the present invention.
Figure 5:
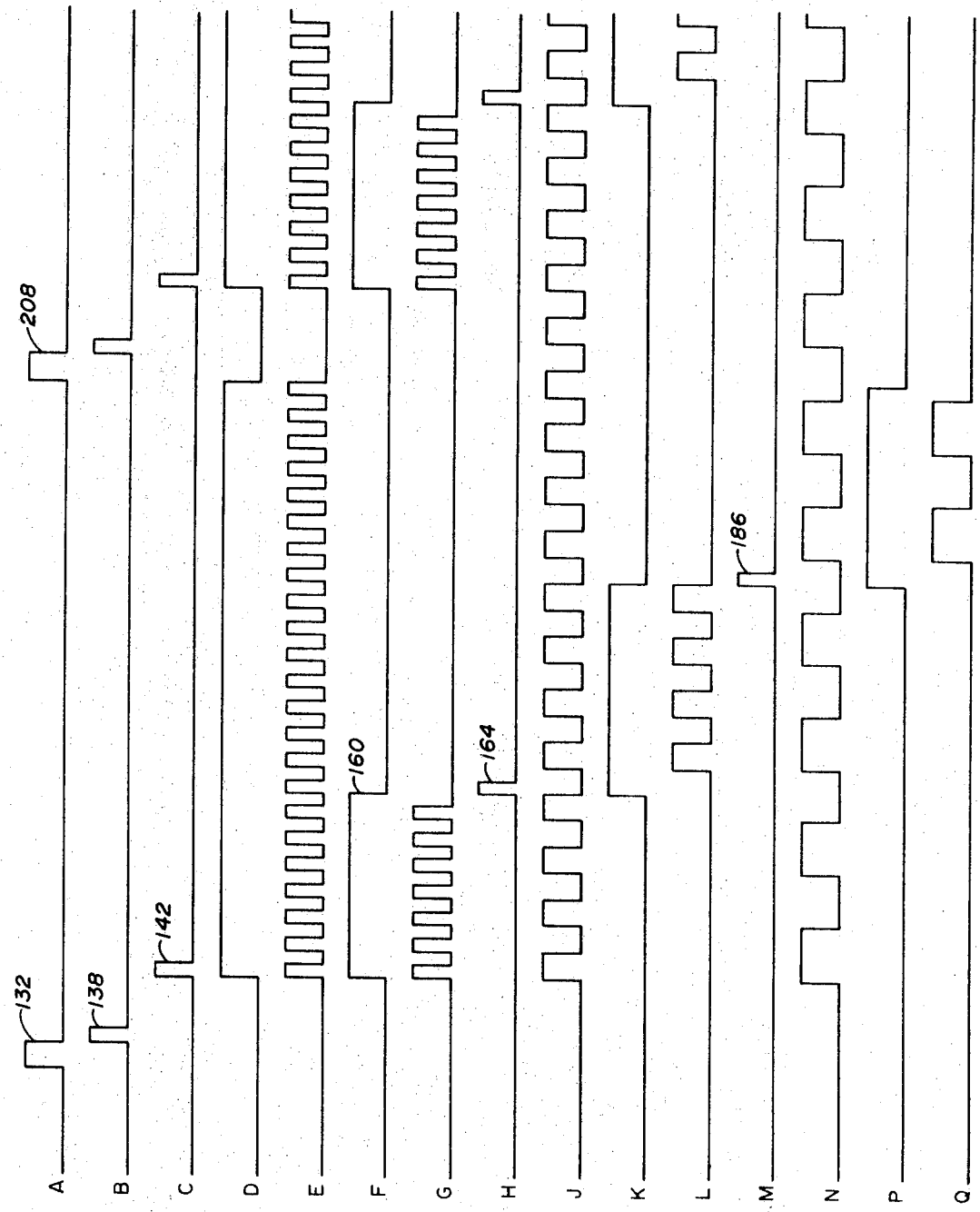
FIG. 5 illustrates a series of pulse waveforms that are generated in the system of FIG. 4.

In addition to the analog system described, a signal representing the frequency of an input may be generated by a digital system. Referring to FIG. 4, there is shown a digital system for producing a numerical readout related to the frequency of an input connected to a terminal 128. Initially, the input signal is converted in a pulse-shaping network 130 into a train of output pulses; one pulse for each cycle of the input signal. Typically, the output of the network 130 may be a train of spaced pulses as illustrated at FIG. 5A. The trailing edge of the pulse 132 triggers various parts of the system to complete a previous cycle and condition the system for a new cycle. To set up the circuit illustrated for a subsequent cycle, the pulse 132 resets various flip-flop units, as will be explained. To complete the previous cycle, the trailing edge of the output pulse 132 enables a readout buffer 134 to transfer a binary count from a counter 136 into a digital readout. After the previous binary count has been stored by operation of the readout buffer 134 and the system reset, the pulse 132 triggers a one-shot multivibrator 137 that produces a pulse 138, illustrated at FIG. 5B, to reset the binary counter 136 to a starting value. Pulse 138 also connects to the input of a one-shot multivibrator 140 which produces an output pulse 142 connected to one control input and the timing input of a flip-flop 144.

The arrival of pulse 142 at the flip-flop 144 changes the output state of the flip-flop on line 146 from a logic zero to a logic One. The output of the flip-flop 144 is illustrated at FIG. 5D. This signal is one input to an AND gate 148 having a second input connected to a clock pulse generator 150. When the voltage on line 146 is at the logic One level, the AND gate 148 produces an output pulse train similar to that generated by the clock 150, as illustrated at FIG. 5E. This train of pulses connects to the timing input of a flip-flop 152, the operation of which will be explained shortly.

In addition, the pulse train output of the gate 148 connects to one input of an AND gate 154. The second input to the AND gate 154 is the output of a flip-flop 156. Flip-flop 156 has one control input tied to the flip-flop 144, a second control input connected to the output of a one-shot multivibrator 158 and a timing input also connected to the multivibrator 158. When the output of the flip-flop 144 changes to the logic One level, the output of the flip-flop 156 likewise changes to the logic One level. This is illustrated by the pulse 160 at FIG. 5F.

With the output of flip-flop 156 at the logic One level, the pulse train output of the gate 148 is transferred through the AND gate 154 to one input of an OR gate 162. The train of pulses connected to the input of the OR gate 162 is illustrated at FIG. 5G. The number of pulses transferred through the gate 154 from the gate 148 depends on the operation of the one-shot multivibrator 158. This multivibrator is triggered by the leading edge of the pulse 160 from the flip-flop 156. It produces an output pulse 164, as illustrated at FIG. 5H, to change the output levels of the flip-flop 156 on lines 166 and 168. Whereas, before the pulse 164 appeared at the flip-flop 156 the signal on the line 166 was at the logic One level and the signal on line 168 at the logic zero level, the pulse 164 reverses this order.

The signal on line 168 connects to one input of an AND gate 170 which has a second input tied to the output of a flip-flop 172. One control input of the flip-flop 172 connects to the multivibrator 158. Accordingly, the pulse 164 also reverses the output state of the flip-flop 172 such that the signal on line 175 is at a logic One level and the signal on line 176 at a logic zero level.

Two of the three inputs to the Gate 170 are now at the logic One level. The third input to the Gate 170 is the output of the flip-flop 152 which is internally connected to produce a train of clock pulses on line 178 at one half the rate of the clock pulses transferred through the gate 148. The output of the flip-flop 152 is illustrated at FIG. 5J.

In addition to connecting to the third input of the AND gate 170, the output of the flip-flop 152 connects to the timing input of a flip-flop 180, the operation of which will be described.

With two inputs to the AND gate 170 at the logic One level, the timing pulses from the flip-flop 152 are transferred to a second input to the OR gate 162. The number of pulses transferred from the flip-flop 152 through the gate 170 depends upon the operation of a one-shot multivibrator 182.

Multivibrator 182 is connected into a circuit similar to that described with respect to the multivibrator 158. The output of the multivibrator 182 connects to the flip-flop 172 and also to a flip-flop 184. When the one-shot multivibrator 182 produces an output pulse 186, as illustrated at FIG. 5M, the output of the flip-flop 172 drops to the logic zero level, thereby blocking the transfer of clock pulses through the AND gate 170.

At the time that the signal on line 175 from the flip-flop 172 drops to the logic zero level, the voltage on line 176 increases to the logic One level. Line 176 interconnects the flip-flop 172 to one input of an AND gate 188. A second input to the AND gate 188 is an output of the flip-flop 184 on line 190. The signal on line 190 is illustrated at FIG. 5P and changes from a logic zero level to a logic One level by the pulse 186 from the multivibrator 182. Thus, upon generation of the pulse 186, two of three inputs to the AND gate 188 are at a logic One level.

A third input to the AND gate 188 is the output of the flip-flop 180 which includes internal interconnections similar to the flip-flop 152 and produces a train of clock pulses at one-half the repetition of the flip-flop 152 or one fourth the repetition of the clock 150. This train of clock pulses is illustrated at FIG. 5N.

In addition to connecting to the AND gate 188, the output of the flip-flop 180 connects to the divide by N flip-flop 192. In the system illustrated, the flip-flop 152 divides the clock pulses by two and the flip-flop 180 makes a further division of two. Additional flip-flops can be interconnected to divide the clock pulses any number of times. In the analog system of FIG. 2, a smoothly varying function that decays exponentially with time was generated. In the digital system of FIG. 4, the number of pulses generated in an interval of time decreases along a curve as given by equation (1) above. Whereas with the analog system a smooth curve of frequency versus time was generated, with the digital system, a similar curve is synthesized by straight line segments. The first line segment represents a change in the initial setting of the binary counter 136 due to the transfer of clock pulses through the gate 154, a second line segment represents a change in the binary count in the counter 136 as a result of clock pulses transferred through the gate 170 and a third line segment a change in the binary count due to clock pulses transferred through the gate 188. Additional line segments may be generated by additional flip-flops for dividing the clock pulses.

The third line segment, as mentioned, results from pulses transferred through the AND gate 188. With two inputs to the AND gate 188 at the logic One level, clock pulses, as illustrated at FIG. 5N, are transferred to one input of the OR gate 162. The number of pulses transferred from the flip-flop 180 through the AND gate 188 to the OR gate 162 depends on the operation of a one-shot multivibrator 194.

Multivibrator 194 is connected to the flip-flop 198 in a circuit arrangement similar to the multivibrator 158. It produces an output on a line 196 to the flip-flop 184 and to a flip-flop 198. The flip-flop 198 provides one input to an AND gate 200 having a second input from the flip-flop 184 and a third input from the nth flip-flop 192. The AND gate 200 operates to transfer pulses from the flip-flop 192 in the manner previously described with respect to the gate 154. The number of pulses transferred through the gate 200 is determined by the operation of a multivibrator 202 which connects to the flip-flop 198 and a reset gate 204.

A second input to the reset gate 204 is the output of an AND gate 206 which has inputs connected to the pulse-shaping circuit 130 and a flip-flop 144. The output of the reset gate 204 connects to the reset terminal of the flip-flops 144, 156, 172, and 184, and produces a reset pulse either as the result of an output pulse from the one-shot multivibrator 202 or the AND gate 206. The multivibrator 202 generates an output pulse at a predetermined time after triggering the flip-flop 198. Since the multivibrator 202 is the last in a chain, the output pulse therefrom to the reset gate 204 produces a pulse which resets the entire system for the start of another cycle. Resetting the flip-flop 144 opens the AND gate 148 to block clock pulses from the clock 150 and resets all the other AND gates controlled by flip-flops to a reset state.

A second condition which will reset the system, other than by operation of the multivibrator 202, is the appearance of a subsequent output pulse from the pulse-shaping circuit 130. This subsequent pulse, illustrated as pulse 208 at FIG. 5A, provides a second input to the AND gate 206 to trigger the reset gate 204. This is the system preconditioning described previously.

Assume the pulse 208 triggers the reset gate 204 before the one-shot multivibrator 194 generates an output pulse to the flip-flop 184. This immediately resets the flip-flop 184 to cut off transfer of clock pulses from the flip-flop 180. In addition, as illustrated at FIG. 5D, the output of the flip-flop 144 drops to a logic zero level, thereby blocking clock pulses from being transferred through the AND gate 148. The system is now reset for a subsequent cycle.

As clock pulses from the AND gates 154, 170, 188 or 200 are connected to the OR gate 162, a train of clock pulses will be transferred to the binary counter 136. These pulses produce a total count in the binary counter 136 which decays in a manner given by the expression $C=1/f$; where $C$ is the number of counts in the counter 136. Thus, the counter 136 starts from some maximum initial value and counts down so long as clock pulses are connected to the OR gate 162. The number of input pulses connected to the OR gate 162 is, as explained, controlled by the various one-shot multivibrators or an output pulse from the pulse-shaping circuit 130.

Although only three flip-flop clock pulse dividers have been illustrated and described, any number may be employed to produce a desired accuracy. Further, the clock pulses may be divided by other factors than two, for example, three, five, six, seven or 14.

While the invention has been described with reference to preferred embodiments, together with modifications thereof, it will be evident that various other modifications are possible without departing from the scope of the invention.

What is claimed is:

1. A system for converting the frequency of an input into an analog voltage proportional to the period of the input frequency, comprising:
    a squaring circuit for converting an input into a square wave having a period corresponding to the period of the input frequency,
    voltage generating means responsive to the square wave for producing a voltage that varies with time in accordance with the expression $V=1/f$ from a reset level,
    a one-shot multivibrator operatively responsive to said squaring circuit for clamping the value of the generated voltage at the level reached at a selected time in each period of the input,
    sample and hold means responsive to the output of said generating means for producing an analog voltage proportional to the clamped value thereof, and
    means responsive to said one-shot multivibrator for generating pulses to inhibit the resetting of the generated voltage for a fixed interval after the clamping time.

2. A system for converting the frequency of an input into an analog voltage as set forth in claim 1 wherein said generating means includes a plurality of RC networks interconnected at the input of an amplifier.

3. A system for converting the frequency of an input into an analog voltage as set forth in claim 2 wherein said RC networks each have a different time constant and are connected in parallel to the input of said amplifier.

4. A system for converting the frequency of an input into an analog voltage as set forth in claim 3 wherein said RC networks are interconnected to a charging circuit means.

5. A system for generating a signal proportional to the frequency of an input, comprising:
    means for generating clock pulses at a fixed rate, a clock pulse counter for storing pulses connected to the input thereof, a plurality of clock pulse dividers each operatively responsive to said means for generating clock pulses and having a pulse rate output equal to some fraction of the fixed rate, a plurality of one-shot multivibrators sequentially connected, the first of said multivibrators operatively responsive to a selected time of each period of the input frequency, a plurality of gating means individually connected to one of said pulse dividers and operatively responsive to one of said one-shot multivibrators, said gating means sequentially coupling the output of one of said pulse dividers into said clock pulse counter, means for generating a signal proportional to the clock pulses accumulated in said counter, and transfer means responsive to the selected time of each period of the input frequency for transferring the clock pulses in said counter to said generating means.

6. A system for generating a signal proportional to the frequency of an input as set forth in claim 5 including means for converting the input into a square wave signal and the first of said one-shot multivibrators and said transfer means are responsive to a selected time of said square waves.

7. A system for generating a signal proportional to the frequency of an input as set forth in claim 6 including means for resetting said pulse counter to a starting value after the pulse count has been transferred to said generating means.

8. A system for generating a signal proportional to the frequency of an input as set forth in claim 7 wherein said means for generating a signal proportional to said counter includes means for converting the accumulated count pulse value into a proportional analog voltage.

9. A system for generating a signal proportional to the frequency of an input as set forth in claim 5 wherein said pulse dividers are interconnected in series and the accumulated clock pulses are transferred to said counter such that the total pulse accumulation decreases along a curve that decays exponentially with time.

10. A system for generating a signal proportional to the frequency of an input as set forth in claim 5 where each successive one-shot multivibrator is actuated from the previous multivibrator.

11. A system for converting the frequency of an input signal into an analog voltage proportional to the period of the input signal frequency, comprising in combination:
  a. converting means for converting said input signal into a square wave having a period corresponding to the period of the frequency of said input signal;
  b. generating means coupled to said converting means for generating an output signal that varies with time in accordance with the expression $V=1/f$ from a reset level;
  c. clamping means coupled to said converting means and said generating means for clamping the value of said output signal at the level reached at a selected time in each period of said input signal;
  d. sampling means coupled to said generating means for producing an analog signal that is proportional to the clamped value of said output signal; and
  e. inhibit means coupled to said clamping means and sample means for producing signal pulses and for coupling said signal pulses to said generating means to inhibit the resetting of said generating means for a selected interval.

12. A system for generating an output signal proportional to the frequency of an input signal, comprising in combination:
  a. pulse generating means for generating clock pulses at a fixed rate;
  b. pulse storing means for storing pulses coupled thereto;
  c. pulse dividing means operatively responsive to said pulse generating means for generating pulse output signals having a rate equal to a selected fraction of said fixed rate;
  d. a plurality of series connected multivibrators, the first of said multivibrators being operatively responsive to a selected time of each period of the frequency of said input signal;
  e. a plurality of signal gating means selectively coupled to said pulse dividing means and operatively responsive to one of said multivibrators, said gating means selectively coupling the pulse output signals of said pulse dividing means to said pulse storing means;
  f. signal generating means operatively responsive to said pulse storing means for generating a signal proportional to the pulse output signals stored in said pulse storing means; and
  g. pulse transfer means operatively responsive to said selected time of each period of the frequency of said input signal for transferring said pulse output signals stored in said pulse storing means to said signal generating means.

13. A system for converting the frequency of an input signal into an output voltage that represents the period of the input signal frequency, comprising in combination:
  a. signal converting means for converting said input signal into a square wave signal having a period corresponding to the period of the frequency of said input signal;
  b. signal generating means coupled to said signal converting means for generating an output signal that varies with time in accordance with the expression $V=1/f$ from a reset level;
  c. signal sampling and storing means coupled to said signal generating means for sampling and storing said output signal at a selected time in each cycle of said square wave signal; and
  d. resetting means coupled to said signal converting means for selectively resetting said signal generating means to said reset level after said selected time.

14. A system for converting the frequency of an input signal into an analog voltage signal that is proportional to the period of the input signal frequency comprising in combination:
  a. signal converting means for converting said input signal into a square wave signal;
  b. signal generating means coupled to said signal converting means for generating a voltage signal that decays with time in accordance with the expression $V=1/f$ from a reset level;
  c. signal sampling and storing means coupled to said signal generating means for sampling and storing said voltage signal at a selected time in each cycle of said input signal;
  d. voltage generating means coupled to said signal sampling and storing means for generating an analog voltage signal proportional to the value of said voltage signal at a selected sampling and storing time, and
  e. resetting means coupled to said signal converting means for generating timing pulses and for selectively resetting said signal generating means to said reset level.

15. The system as set forth in claim 14 wherein said resetting means includes inhibit means for generating inhibit pulses to delay the resetting of said signal generating means for a time interval after said sampling and storing time.

16. The system as set forth in claim 15 and further including means for varying the width of said inhibit pulses in accordance with said analog voltage generated by said voltage generating means.